United States Patent [19]

Ryham

[11] Patent Number: 4,930,429

[45] Date of Patent: Jun. 5, 1990

[54] APPARATUS AND PROCESS FOR GENERATING STEAM FROM WET FUEL

[75] Inventor: Rolf Ryham, Princeton, N.J.

[73] Assignee: Ahlströmföretagen Svenska AB, Norrköping, Sweden

[21] Appl. No.: 402,076

[22] Filed: Sep. 1, 1989

Related U.S. Application Data

[63] Continuation-in-part of Ser. No. 231,085, Aug. 11, 1988, Pat. No. 4,878,441.

[51] Int. Cl.$^5$ .............................................. F23G 5/12
[52] U.S. Cl. .................................... 110/229; 110/224; 110/227; 110/341; 48/197 R; 48/209
[58] Field of Search .............. 110/224, 221, 234, 341, 110/238, 229, 227; 122/5.5 A; 367 PF, 479 A, 28; 48/197 R, 209; 162/30.1, 30.11, 47

[56] References Cited

U.S. PATENT DOCUMENTS

| | | | |
|---|---|---|---|
| 3,714,911 | 2/1973 | Pradt | 162/30.11 |
| 3,818,869 | 6/1974 | Blaskowski | 110/229 |
| 4,311,103 | 1/1982 | Hirose | 110/238 |
| 4,344,373 | 8/1982 | Ishii et al. | 48/209 |
| 4,388,875 | 6/1983 | Hirose | 110/224 |
| 4,421,524 | 12/1983 | Chittick | 48/209 |
| 4,429,643 | 2/1984 | Mulholland | 110/221 |
| 4,507,127 | 3/1985 | Hirose | 110/229 |

Primary Examiner—Edward G. Favors
Assistant Examiner—Denise L. Ferensic
Attorney, Agent, or Firm—Cohen, Pontani & Lieberman

[57] ABSTRACT

A process and apparatus for the gasification of partially dried fuel with hot gas which has been heated by bringing it into contact with an inert hot heat carrier. The fuel gases generated during the gasification process are further combusted and utilized for heating the inert heat carrier. The process and apparatus can be combined with a process and apparatus for generating steam from wet fuel wherein water is evaporated from the wet fuel by bringing the fuel into direct contact with superheated steam. The steam is superheated by bringing it into contact with a second hot heat carrier. The second heat carrier is heated by bringing it into direct contact with the fuel gas produced by combusting the fuel gas from the gasification process.

18 Claims, 2 Drawing Sheets

APPARATUS AND PROCESS FOR GENERATING STEAM FROM WET FUEL

RELATED APPLICATIONS

This is a continuation-in-part of application Ser. No. 231,085, filed Aug. 11, 1988 now U.S. Pat. No. 4,878,441.

TECHNICAL FIELD

The present invention relates generally to the generation of steam from wet fuel and more particularly to a process in which the fuel is first partially dried and thereafter gasified with hot gas heated by an inert heat carrier whereby the fuel gases generated in the gasification process are further combusted and utilized to produce energy and to heat the inert heat carrier which indirectly supplies the energy for the endothermic gasification reaction. The process can be applied, e.g. to any solid organic combustible material having a high water content such as bark and peat or to sludges such as spent pulping liquors and the like.

BACKGROUND OF THE INVENTION

To recover chemicals and generate steam, spent pulping liquor known as black liquor is usually burned in a recovery boiler. The organic compounds of the black liquor are recovered in the form of a smelt which can be regenerated to provide pulping liquor. Heat is thereby removed from the flue gas by heat transfer elements such as water filled tubes in which the water is converted into steam by indirect heat exchange. The heat content of the flue gas discharged from the furnace can be used to concentrate black liquor by evaporation by direct heat exchange wherein a product having a dry solids content of about 55% is converted into a product having a dry solids content of 65–70%. This method involves, however, a number of disadvantages regarding the heat economy as well as environmental problems.

To avoid the drawbacks caused by the direct contact between the flue gas and the black liquor it has been suggested, as is described in the Canadian Pat. No. 917858, to concentrate black liquor to a dry solids content of 65–70% in a cascade evaporator by direct contact with a circulating steam flow, which is superheated by indirect contact with the flue gas from the recovery furnace. The recovery furnace is of conventional design and is provided with water filled tubes. The black liquor supplied to the cascade evaporator has been concentrated to a fairly high dry solids content in a conventional system.

DISCLOSURE OF THE INVENTION

It is an object of the present invention to eliminate all liquid cooled stationary heat transfer surfaces in the process and apparatus of this invention.

It is an other object of the present invention to enable the removal of water from wet fuel without directly contacting the wet fuel with a heat transfer surface.

It is a further object of the present invention to essentially eliminate the feed water system of the furnace by generating steam from the water content of the fuel.

It is yet another object of the present invention to at least partially dry the wet fuel and thereafter gasify the fuel to generate carbon monoxide and other useful fuel gases for further combustion. The gasification process is generally conducted by directly contacting the fuel with water vapor and hot gas which, in turn, is heated in direct contact with an inert heat carrier.

According to the method and apparatus of the present invention, (a) water is evaporated from wet fuel by directly contacting the wet fuel with super heated steam thereby producing at least partially dried fuel and saturated steam; (b) at least a portion of the saturated steam is superheated by directly contacting the steam with a hot heat carrier thereby producing a cooled heat carrier; (c) the at least partially dried fuel from step (a) is gasified by direct contact with hot gas which has been heated by direct contact with an inert heat carrier to produce fuel gases; (d) the fuel gases are further combusted; (e) a first part of the combusted gases are used to indirectly heat the heat carrier used in step (c); (f) a second part of the combusted gases are used to drive a gas turbine; (g) the cooled heat carrier of step (b) is heated by directly contacting the carrier with gases exiting the gas turbine and (h) the heated heat carrier is used as the heating medium in step (b).

It is an advantage of the present invention that the steam which is produced during the process is derived from the wet fuel. It is also advantageous that the water vapor required in the gasification process is derived from the wet fuel during the evaporation step. Alternatively, steam or water vapor for the gasification process may also be used from an external source, or the water content of the partially dried fuel can be sufficiently high so that no or only little additional steam must be added. In the method and apparatus of the present invention any combustible material may be utilized as fuel. Thus, the fuel may be any combustible material such as wood residue and bark, sewage sludge, oil refinery wastes, sludge from paper and pulp processes, sludges from the pharmaceutical industry and, of course, carbonaceous materials such as coal. The dry solids content (TDS) of the wet fuel is not important as long as the heat content of the dried fuel is sufficient to drive off the water from the fuel and the fuel will burn or can be pyrolized without auxiliary combustible material. Is the heat content of the fuel insufficient to evaporate the water from the fuel prior to the combustion, pyrolysis or gasification thereof, the heat content of the fuel may be supplemented by the addition of other combustible material in the furnace or by using multiple evaporation techniques for part of the water removal or a combination of both. Such modification is understood to be a part of the present invention.

The method and apparatus of the present invention may also be used advantageously as a mobile operation which can be moved to and operated at any particular location as needed. Thus, peat having a dry solids content of about 15% could be harvested at location and treated in the apparatus and according to the method of the present invention at the harvest site. The water is first partially evaporated from the wet peat by bringing it into direct contact with superheated steam in an evaporator or boiler thereby producing preferably at least partially dried peat moss having a dry solids content (TDS) of about 95% and saturated or superheated steam which may be utilized to drive a turbine for the generation of electricity. Prior or after driving the turbine, the steam can be utilized to supply the required water vapor in the gasification process.

A portion of the saturated steam may be superheated by direct contact with a hot heat carrier resulting in superheated steam and a correspondingly cooled heat carrier. The cooled heat carrier is thereafter contacted with flue gases produced by burning the fuel gases produced during the gasification of the peat moss previously partially dried in the evaporator or boiler, as is more fully described below. The gasification is performed by directly contacting the dried fuel in the presence of water vapor (which may be derived from the wet fuel or added as needed) with hot gas or gases which have been heated with an inert hot heat carrier. The fuel gas, i.e. the gas generated during the gasification process including product gas or power gas is thereafter further combusted preferably with pressurized air and a part thereof, after preferably driving a turbine, is utilized for heating the cooled heat carrier used to generate steam from the wet fuel. A second part of the combustion gases or flue gases is introduced into a heat exchanger, to heat the cooled heat carrier utilized to heat the gas used in the gasification of the dried fuel.

Accordingly, when the method is applied to peat, it is possible to use pressed peat having a dry solids content of 12–15% without predrying. The heat content of dry peat is about 3500–4000 Kcal/kg, which means that about 6–7 kg normal steam/kg dry fuel can be produced. It is thus possible to generate about 6–7 kg steam from about 7-8 kg wet fuel. About the same result is achieved by processing spent pulping liquor.

BRIEF DESCRIPTION OF THE DRAWINGS

The invention will be described in more detail in the following with reference to the accompanying drawings, which illustrate preferred embodiments of the invention.

DESCRIPTION OF THE PRESENTLY PREFERRED EMBODIMENT

Figure 1:
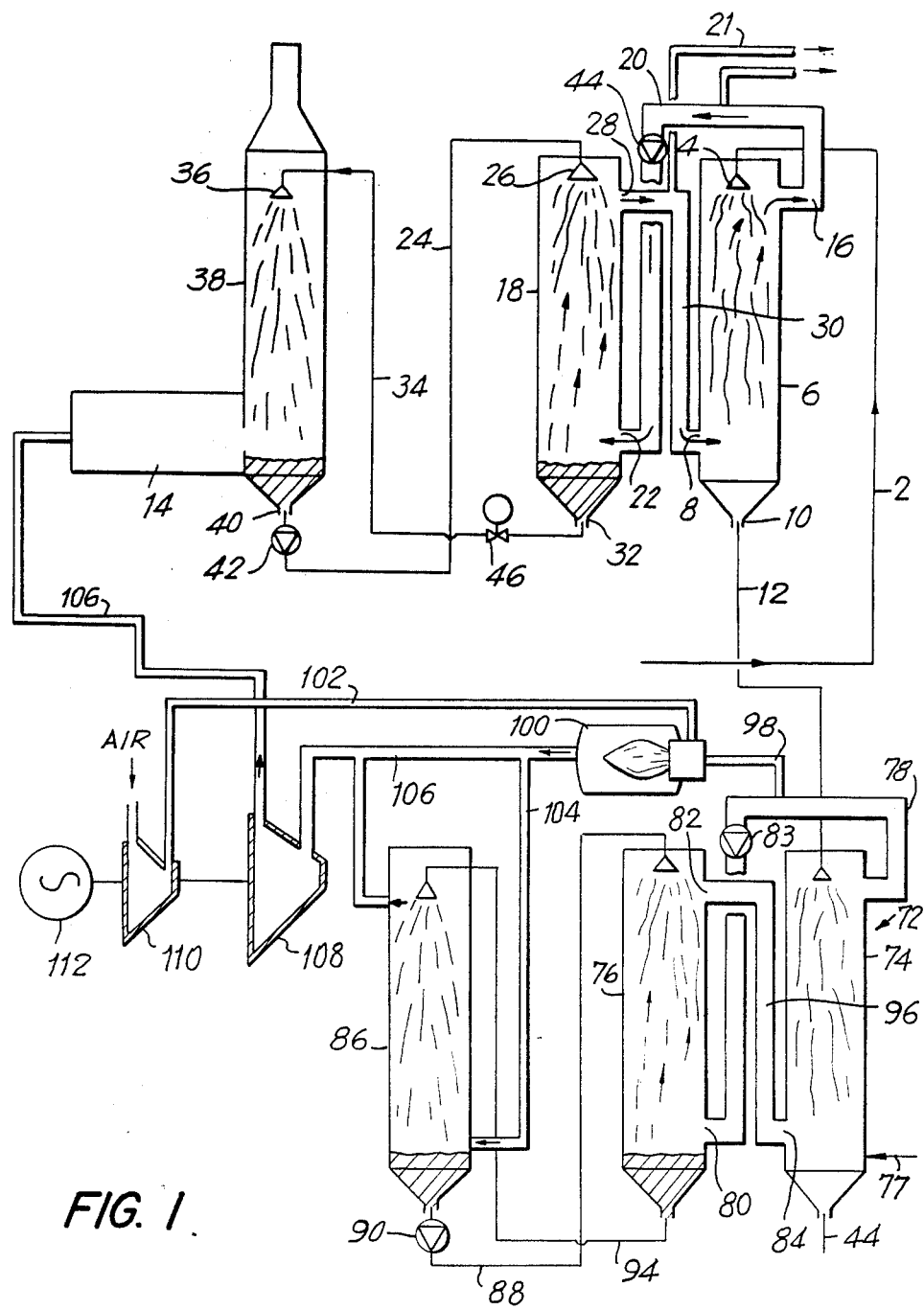
FIG. 1 is a schematic view of a system for carrying out the process according to the invention.

As shown in FIG. 1, wet fuel such as, for example, black liquor is introduced through line 2 preferably into the upper part of an upright evaporator or boiler 6. The fuel is distributed in finely divided form preferably evenly, by any suitable means such as distributor 4. Superheated steam having a temperature of from about 400–1000° C. is then introduced through inlet 8 preferably located in the lower part of the evaporator which may be pressurized. At least a portion of the superheated steam may be removed at 21 for external use such as, for example, for driving a turbine and for providing the required water vapor in the gasification reaction. The steam flows through the evaporator preferably in counter-flow to and in direct contact with the wet fuel flowing down from the distributor means. Due to the superheated steam directly contacting the wet fuel, water is removed from the black liquor by evaporation converting the superheated steam into saturated steam having a temperature of about 250° C. and a pressure of about 40 bar. The steam contains the water evaporated from the black liquor. The black liquor with the water partially removed therefrom, is discharged through outlet 10, preferably located at the bottom of the evaporator, and passed through line 12 to a reactor 72 comprising a preferably upright first reactor vessel 74 which is in fluid communication with a second reactor vessel 76 as will be further described below. The steam exiting evaporator 6 is supplied to a scrubber 18 through line 20. The saturated steam is introduced into scrubber 18 through inlet 22 which is preferably located in the lower part of the scrubber. In scrubber 18 the saturated steam is superheated to a temperature of about 400–1000° C. by direct contact with an inert hot heat carrier having a temperature of about 500–1100° C. The heat carrier may be any material which absorbs heat and which is inert, i.e. will not react with other process reactants or components or be altered thereby or vice versa. Examples of suitable inert heat carriers are thermally stable oils, liquid metals, solid metals, sand and ceramic materials such as refractory particulate material which can be heated without decomposition or substantial structural change to at least about 450° to about 1100° C.

The hot heat carrier is supplied to scrubber 18 through a line 24 via a distributor means 26 preferably disposed in the upper part of the scrubber. Scrubber 18, as evaporator 6, is preferably pressurized at about 40 bar. Saturated steam is flowing through scrubber 18 in counter-flow and in direct contact with the hot heat carrier flowing down from distributor means 26 being preferably evenly distributed thereby. The superheated steam is discharged from scrubber 18 through outlet 28, preferably located in the upper part of the scrubber, and is past to evaporator 6 through line 30 connecting scrubber outlet 28 to evaporator inlet 8. The heat carrier which has cooled down to about 250–300° C. by transfer of heat to the saturated steam is collected at the bottom of scrubber 18 and discharged through outlet 32 in the bottom thereof and passed through line 34 to distributor means 36 preferably disposed in the upper part of a stack scrubber 38. As will be recognized the structure of distributor means 4, 26, 36, 83 and 92 such as, for example, nozzles, spray nozzles or rotating disks will depend on the respective fuel and heat carrier utilized in the process of the present invention. To increase the respective exposed surface of the fuel and the heat carrier, both materials are preferably evenly distributed and in finely divided form throughout the respective reaction vessel such as evaporator 6, scrubber 18 and stack scrubber 38.

Hot gas at a temperature of about 700–1200° C. is introduced into stack scrubber 38 preferably at the bottom thereof in counter-flow and in direct contact with the heat carrier flowing down from distributor 36 thereby heating the heat carrier to a temperature of about 500–1100° C. The hot heat carrier is then discharged from the stack scrubber through outlet 40 located preferably in the bottom thereof and passed through line 24 to scrubber 18.

As mentioned above, scrubber 18, evaporator 6, scrubber 38 and reactor vessels 74 and 76 are preferably pressurized. It will also be understood that stack scrubber 38 may be also a fluid bed installation, preferably a circulating fluidized bed (FIG. 2) wherein the heat content of the flue gas is transferred to the inert heat carrier in direct contact therewith and wherein the hot heat carrier may be discharged from and the cool heat carrier returned to the fluidized bed as required.

Figure 2:
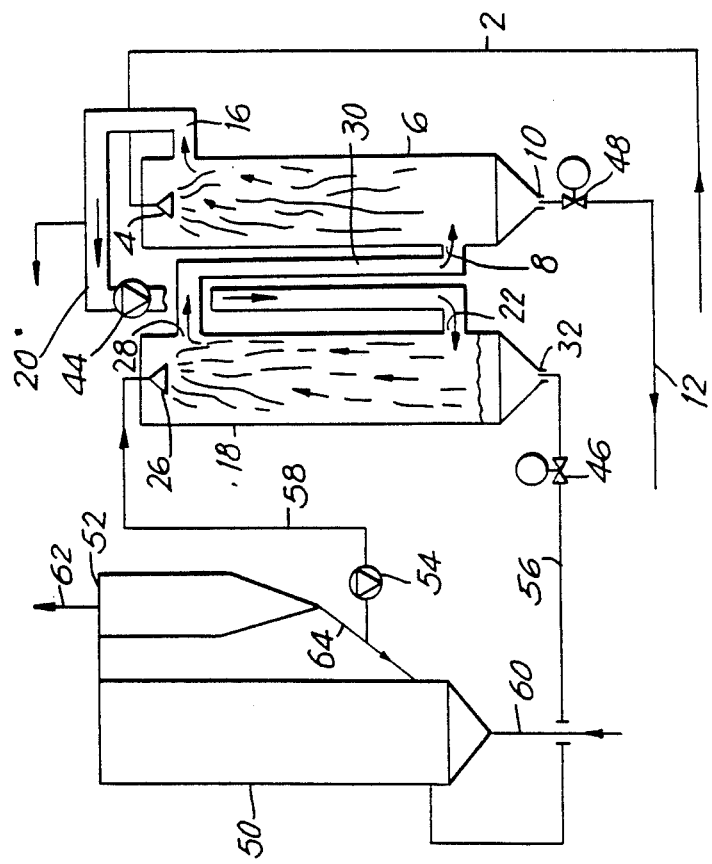
FIG. 2 is a schematic view of another embodiment of the apparatus and process of the present invention.

As shown in FIG. 2 the cooled heat carrier having a temperature of about 250° C. is removed from scrubber 18 through outlet 32 in the bottom thereof and introduced via valve 46 and line 56 into circulating fluidized bed chamber 50. As fluidizing gas for the heat carrier is preferably used the hot gas originating from reactor 72 (FIG. 1) as described below and which is introduced into the bottom of fluidizing chamber 50 through line 60. In the fluidized bed chamber 50, the heat carrier will remove heat from the gas. The heated heat carrier entrained in the gas leaves chamber 50 and is separated in separator 52 in known manner, whereby the fluidizing gas is removed through outlet 62 and the heat carrier is recycled through line 64 to the bottom of chamber 50. Heated heat carrier may be withdrawn from the circulating fluidized bed and introduced into scrubber 18 through line 58. In case the system is pressurized the heat carrier is introduced into scrubber 18 via pump 54 which may, for example, be a rotary screw pump. The heat carrier, such as sand, may also be fluidized in a thermally stable liquid as a carrier so that the sand can be pumped with centrifugal force. After the desired pressure has been achieved, the fluidizing liquid may be removed prior to the heat carrier reaching distributor 26. The removed fluidizing liquid is thereafter returned to the suction side of pump 54.

Structural elements of the evaporator, scrubber, stack scrubber and fluidized bed are standard technology and need not be discussed further.

Pumps 42 and 54 for conveying the hot heat carrier from stack scrubber 38 (circulating fluidized bed 50, 51) to scrubber 18 and fan 44 for circulating the steam are also of conventional design and need not be further described. Of course, any other suitable means for transporting the heat carrier and the fuel such as screw feeders may be used.

Turning back to FIG. 1, the partially dried fuel, i.e. fuel having a dry solids content of about 95% is withdrawn from ( evaporator/boiler 6 through line 12 and introduced through a distributor 83 into the top of first reactor vessel 74 of reactor 72. Reactor vessel 74 is connected to a second reactor vessel 76 in a manner similar to that described in connection with evaporator 6 and scrubber 18. Thus, the respective tops and bottoms of reactor vessels 74, 76 are reversely interconnected by conduit 78 located in the upper part of reactor vessel 74 and in fluid connection with inlet 80 located at the bottom part of reactor vessel 76. Reactor vessel 76 has, preferably at the top thereof, an outlet 82 connected to inlet 84 at the bottom of first reactor vessel 74. A fan 83 transports the hot fuel gases from vessel 74 to vessel 76. Reactor 72 is a pyrolysis chamber or reactor vessel in which the partially dried fuel such as black liquor having a dry solids content of preferably about 95% is gasified at about 450–500° C. in the presence of water vapor to form fuel gases including product gas or water gas. As mentioned above, advantageously the water vapor necessary for the gasification reaction is taken from the evaporation process and introduced into vessel 74 through line 77. External steam may, of course, also be used. As a third alternative some of the steam may also originate from the partially dried fuel itself. The gasification process itself is well known to those having skill in the art, e.g. Pulse-Enhanced Indirect Gasification For Black Liquor Recovery, K. Durai-Swamy et al., *Chemical Recovery*, pp. 217–221 (1989).

The advantageous feature of the process of the present invention is that the heat required in the pyrolysis process is provided by an inert heat carrier, which may be the same material as that described above in connection with evaporator 6 and scrubber 18. Thus, the inert heat carrier may be any material which absorbs heat and which is inert, i.e. will not react with other process reactants or components or be altered thereby. The inert heat carrier which may, for example, be sand or limestone if a sulfur containing fuel is used and the removal of sulfur is desired, is first directly heated in heat exchanger 86 and conveyed through line 88 by pump 90 and introduced into reactor vessel 76 through distributor 92. The cooled heat carrier is collected at the bottom of reactor vessel 76 and returned to heat exchanger 86 through line 94. Hot gas, such as fuel gases or air or a mixture thereof, heated in reactor vessel 76 by contact with the hot heat carrier is introduced from reactor vessel 76 through conduit 96 into the bottom of reactor vessel 74 at about 450–500° C. for counter current contact with the partially dried fuel. In the endothermic gasification reaction in reactor 74, fuel gas such as product gas or water gas is produced in the presence of steam, which gas is withdrawn from reactor 74 through conduit 78. As mentioned above, if the material to be gasified still contains sufficient water to provide the necessary steam for the gasification reaction only little additional steam must be added. At any rate, the water vapor present during the gasification of the partially dried fuel should be sufficient to sustain the known chemical reactions $C + heat + H_2O \rightarrow CO + H_2$; and possibly also $CO + heat + H_2O \rightarrow CO_2 + H_2$.

The flow of the product gas is thereafter divided in two streams, one of which is reintroduced into reactor vessel 76 for contact with the hot heat carrier. A second part of the product gas generated in reactor vessel 74 is withdrawn from line 98 and combusted in furnace 100 with pressurized air introduced into furnace 100 through line 102. In furnace 100 the product gas is combusted to mainly carbon dioxide and water vapor at a temperature of about 1200–1600° C. The hot combusted flue gases removed from the furnace 100 are fed to heat exchanger 86 through by-pass flow 104 for direct heat exchanging contact with the inert heat carrier therein. From there, the gas is fed back to line 106 and preferably utilized for driving turbine 108 at a temperature of about 1400° C. and thereafter introduced into scrubber 38 (or fluidizing chamber 50) at a temperature of about 700–1200° C. for contact with the inert heat carrier therein, as has been described above. Connected to turbine 108 is a compressor 110 and a generator 112 for the production of electricity and compressed air to maintain the combustion in furnace 100.

While the majority of heretofore known processes for the recovery of chemicals and heat from waste liquor resulted in the recovery of sodium salts in the form of a smelt, the process of the instant invention results in sodium carbonate being discharged from reactor vessel 74 through line 114 in dry solid form since the process is operated at only about 500° C.

The advantages of the described system for generation of steam, electricity and the recovery of chemicals from black liquor compared with a conventional recovery boiler and evaporator system are that (a) the black liquor is gasified in the presence of water vapor to form flue gas which is further combusted and the heat content thereof indirectly used in the pyrolysis process as well as for the generation of electricity; (b) no heat transfer surfaces are in contact with the black liquor in the evaporator stage; (c) no heat transfer surfaces are in contact with the partially dried black liquor during the pyrolysis process; (d) the pyrolysis process of black liquor is conducted at a temperature so that no smelt is produced thereby avoiding smelt-water explosions; (e) there are no water cooled surfaces in the recovery furnace or pyrolysis reactor vessel; and (f) no feed water system is required; and (g) the water vapor required for the gasification process originates during the evaporation of the wet fuel.

The most serious drawback of a water-cooled recovery boiler is that there is always the risk of water leakage. A leakage of water into the smelt results usually in a violent explosion causing damage to the apparatus as well as injury to the operating personnel. Also, as there are no tubes in the furnace of the present invention, there are present less restrictions regarding the structural design of the furnace. The furnace may be constructed irrespective of the demands a circulating water/steam heat exchange medium may set regarding the design parameters thereof.

The pyrolysis process is preferably operated at a pressure of about 20-25 bar and at a temperature of about 500° C. It is understood that the pyrolysis process can be operated separately from the drying process of FIG. 1 and 2. The net effect of this combination process is about 40-45% if the energy content of the dry fuel is converted to electricity and if the steam produced at the drying process is also used for the production of electrical power. The fuel used in the pyrolysis process may be any combustible material as described above including sludges, peat, low grade coals, black liquor or any low grade fuel containing large quantities of water.

The term "partially dried" material or fuel means material having a dry solids content of about 35 to 95%.

The above-mentioned advantages of the apparatus and method of the present invention not only apply to the processing of black liquor but also to other suitable fuels such as peat, industrial waste materials and sludges.

While a specific embodiment of the invention has been shown and described to illustrate the principals of the invention, it will be understood that the invention may be embodied otherwise without imparting from such principals. Thus, the present invention may be utilized in connection with pressurized combined cycles without using any water filled heat transfer surfaces. In certain cases, for instance, if the heat carrier is easily entrained by a gas flow in the stack scrubber, it may be preferred to cause the heat carrier to flow in the same direction as the flue gas. The heat carrier will then be introduced at the lower end of the stack scrubber and be separated from the gas in a cyclone separator connected to the upper end of the stack scrubber. If desired, a portion of the heat carrier can also be recycled to the stack scrubber. Also, if a smelt is used as heat carrier a ceramic pump may be used for conveying the hot smelt, for example, from a recovery boiler.

It should be understood that the preferred embodiments and examples described above are for illustrative purposes only and are not to be construed as limiting the scope of the invention which is properly delineated only in the appended claims.

What is claimed is:

1. A process for treating wet fuel comprising the steps of:
   (a) evaporating water from wet fuel by bringing said fuel into direct contact with superheated steam to produce at least partially dried fuel and saturated steam;
   (b) superheating at least a portion of said saturated steam by bringing said steam into direct contact with a hot first heat carrier to produce a cooled first heat carrier;
   (c) heating said first cooled heat carrier by bringing said first heat carrier into contact with hot combusted flue gas;
   (d) utilizing said first heated heat carrier as the heating medium for said steam in step (b);
   (e) generating fuel gas by gasifying said partially dried fuel with heated gas;
   (f) generating said heated gas by bringing gas into direct contact with a hot second heat carrier;
   (g) combusting at least part of said fuel gas to produce said hot combusted flue gas;
   (h) generating said hot second heat carrier by directly contacting a heat carrier with at least part of said hot combusted flue gas; and
   (i) utilizing said hot second heat carrier as the heating medium in step (f).

2. The process of claim 1, additionally comprising the steps of operating a gas turbine with said hot combusted flue gas prior to bringing said hot combusted flue gas into direct contact with said cooled first heat carrier in step (c); and
   combusting said fuel gas in step (g) by addition of air generated in a compressor operated by said gas turbine.

3. The process of claim 1, wherein said wet fuel is dried to a dry solids content of about 95% prior to gasifying said fuel with said heated gas in step (e).

4. The process of claim 1, wherein said process is pressurized.

5. The process of claim 1, wherein the water content of the partially dried fuel is sufficiently great to provide the water vapor for the gasification reaction of step (e).

6. The process of claim 1, wherein said gasification of step (e) is conducted by adding water vapor generated during said evaporation step (a).

7. A process for treating fuel comprising:
   (a) gasifying fuel with heated gas to produce fuel gas;
   (b) generating said heated gas by bringing gas into direct contact with a hot heat carrier;
   (c) combusting at least part of said fuel gas to produce hot flue gas;
   (d) generating said hot heat carrier by directly contacting a heat carrier with said hot flue gas; and
   (e) utilizing said hot heat carrier as the heating medium in step (b).

8. The process of claim 7, wherein said fuel is generated from spent pulping liquor.

9. The process of claim 7, wherein said fuel is a solid fuel.

10. The process of claim 7, wherein said fuel is peat.

11. The process of claim 7, wherein said fuel has a dry solids content of about 95%.

12. An apparatus for the treatment of wet fuel comprising:
   (a) means for gasifying fuel comprising a first reactor vessel, means for introducing steam and fuel into said first vessel, means for discharging fuel gas from said first vessel; and means for introducing heated gas into said first vessel for gasifying said fuel and causing the generation of said fuel gas;
   (b) means for generating heated gas comprising a second reactor vessel, means for introducing a heated first heat carrier into said second vessel, means for feeding at least part of said fuel gas from said first vessel to said second vessel, means for feeding said heated gas from said second vessel to said first vessel; and means for discharging cooled first heat carrier from said second vessel;

(c) means connected to said fuel gas feeding means for combusting said fuel gas to produce hot flue gas;
(d) means connected to said combusting means for contacting at least part of said hot flue gas in heat exchanging relation with said cooled first heat carrier to generate said heated first heat carrier;
(e) means for transferring cooled first heat carrier from said second vessel to said contacting means;
(f) means for transferring heated first heat carrier from said contacting means to said second vessel;
(g) means for evaporating water from wet fuel comprising a first chamber means for introducing wet fuel into said first chamber, means for discharging steam from said first chamber, and means for introducing superheated steam into said first chamber for direct contact with said wet fuel for causing the evaporation of water therefrom;
(h) means connected to said first chamber for generating superheated steam comprising a second chamber, means for introducing a heated second heat carrier into said chamber, means for feeding the steam discharged from said first chamber into said second chamber, means for discharging superheated steam from said second chamber; means for feeding the discharged superheated steam to said first chamber; and means for discharging cooled second heat carrier from said second chamber;
(i) means connected to said second chamber for generating a heated second heat carrier for introduction into said second chamber comprising a third chamber, means for introducing said flue gas from said combusting means into said third chamber, means for introducing into said third chamber the cooled second heat carrier discharged from said second chamber for heating of said second heat carrier by said combusted flue gas in said third chamber, means for discharging the second heat carrier from said third chamber and means for feeding the second heated heat carrier from said discharge means to said second chamber; and
(j) means connected to said first chamber for feeding the dried fuel from said first chamber to said first reactor vessel.

13. The apparatus of claim 12, additionally comprising means connected to said evaporating means and said gasifying means for transferring steam from said evaporating means to said gasifying means.

14. An apparatus for the treatment of fuel comprising:
(a) means for gasifying fuel comprising a first reactor vessel, means for introducing fuel into said first vessel, means for discharging fuel gas from said first vessel, and means for introducing heated gas into said first vessel for gasifying said fuel and causing the generation of fuel gas;
(b) means for generating heated gas comprising a second reactor vessel, means for introducing a heated first heat carrier into said second vessel, means for feeding at least part of said fuel gas from said first vessel to said second vessel, means for conveying heated gas from said second vessel to said first vessel, and means for discharging cooled first heat carrier from said second chamber;
(c) means connected to said fuel gas feeding means for combusting said fuel gas to produce hot combusted flue gas;
(d) means connected to said combusting means for contacting at least part of said hot combusted flue gas in heat exchanging relation with said cooled first heat carrier to generate said heated first heat carrier;
(e) means for transferring cooled first heat carrier from said second vessel to said contacting means; and
(f) means for transferring heated first heat carrier from said contacting means to said second vessel.

15. The apparatus of claim 14, additionally comprising:
means connected to said gasifying means for evaporating wet fuel by direct contact with superheated steam;
means connected to said evaporating means for generating superheated steam by direct contact with a second hot heat carrier;
means connected to said superheated steam generating means for generating said second hot heat carrier by contact with said hot combusted flue gas.

16. An apparatus for the treatment of wet fuel comprising:
(a) means for evaporating wet fuel by direct contact with superheated steam;
(b) means connected to said evaporating means for generating superheated steam by direct contact with a first hot heat carrier;
(c) means connected to said superheated steam generating means for generating said first hot heat carrier by contact with hot flue gas;
(d) means connected to said evaporating means for generating fuel gas by gasifying partially dried fuel;
(e) means connected to said fuel gas generating means for combusting said fuel gas to produce hot combusted flue gas;
(f) means for conveying at least part of said hot flue gas from said combusting means into said first hot heat carrier generating means;
(g) means connected to said fuel gas generating means for generating hot gas by contacting gas with a second hot heat carrier; and
(h) means connected to said combusting means and said hot gas generating means for generating said hot second heat carrier by direct contact with said hot combusted flue gas.

17. The apparatus of claim 16, wherein the evaporating means comprises a first chamber, means for introducing wet fuel into said first chamber, means for discharging steam from said first chamber, and means for introducing superheated steam into said first chamber for direct contact with said wet fuel for causing the evaporation of water therefrom; said superheated steam generating means comprising a second chamber, means for introducing a heated second heat carrier into said chamber, means for feeding the steam discharged from said first chamber into said second chamber, means for discharging superheated steam from said second chamber; means for feeding the discharged superheated steam to said first chamber; and means for discharging cooled second heat carrier from said second chamber; said second heat carrier generating means comprising a third chamber, means for introducing said flue gas from said combusting means into said third chamber, means for introducing into said third chamber the cooled second heat carrier discharged from said second chamber for heating said second heat carrier by said combusted flue gas in said third chamber, means for discharging the second heat carrier from said third chamber and means for feeding the second heated heat carrier from said discharge means to said second chamber; and means connected to said first chamber for feeding at least partially dried fuel from said first chamber to said first reactor vessel.

18. The apparatus of claim 16, additionally comprising means connected to said evaporating means and said fuel gas generating means for conveying water vapor from said evaporating means to said fuel gas generating means.

* * * * *

UNITED STATES PATENT AND TRADEMARK OFFICE
CERTIFICATE OF CORRECTION

PATENT NO. : 4,930,429

DATED : June 5, 1990

INVENTOR(S) : Ryham, Rolf

It is certified that error appears in the above-identified patent and that said Letters Patent is hereby corrected as shown below:

Column 9, line 13 After chamber insert -- , --;

Signed and Sealed this

Twelfth Day of November, 1991

*Attest:*

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,930,429
DATED : June 5, 1990
INVENTOR(S) : RYHAM, Rolf

It is certified that error appears in the above-identified patent and that said Letters Patent is hereby corrected as shown below:

Column 9, line 63, change "chamber" to --vessel--;

Column 10, line 54, change "second" to --first--;

Column 10, line 60, change "second" to --first--;

Column 10, line 61, change "second" to --first--;

Column 10, line 64/65, change "second" to --first--;

Column 10, line 66, change "second" to --first--;

Column 11, line 1, change "second" to --first--.

Signed and Sealed this

Ninth Day of February, 1993

Attest:

STEPHEN G. KUNIN

Attesting Officer

Acting Commissioner of Patents and Trademarks